Patented Feb. 19, 1952

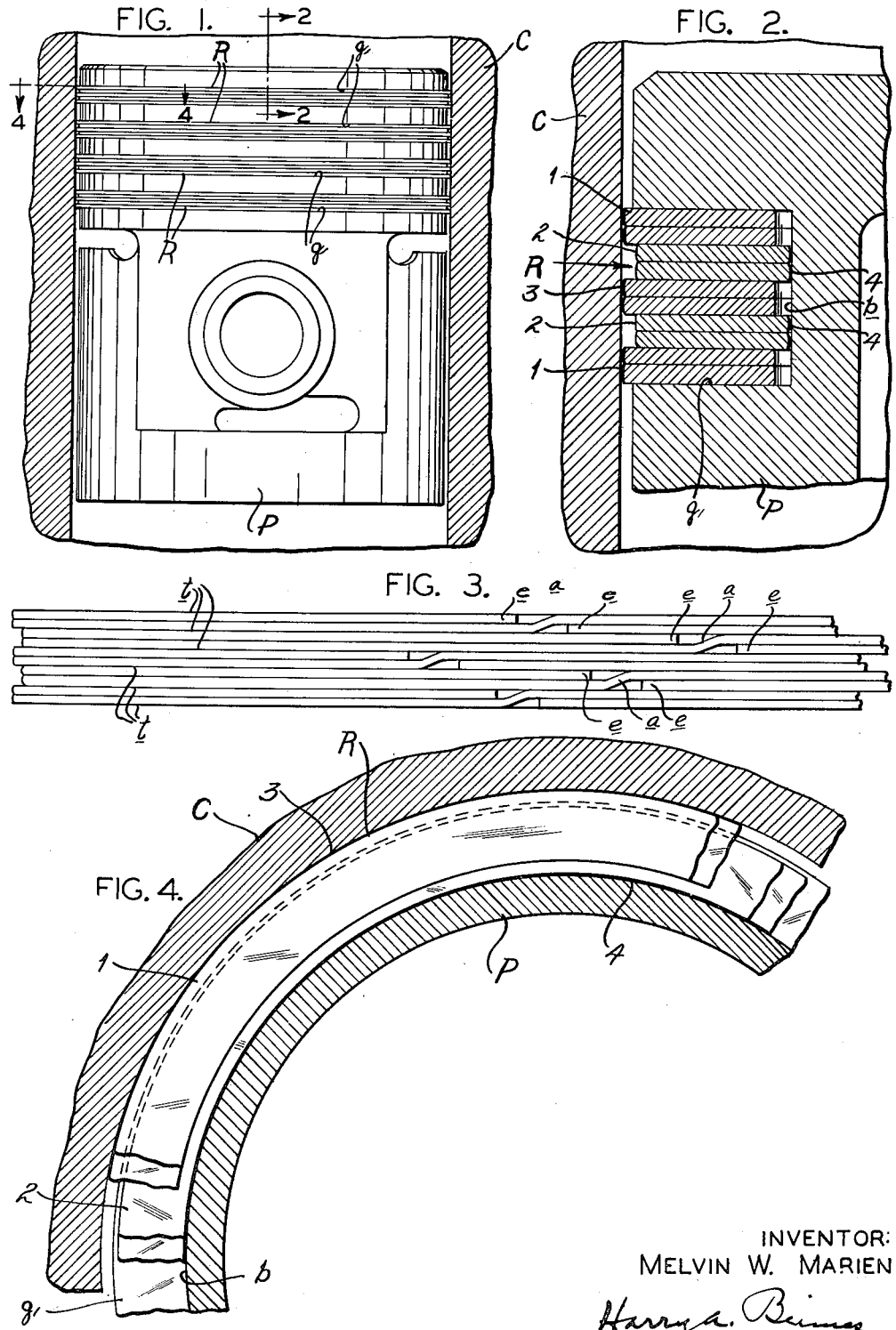

2,585,952

UNITED STATES PATENT OFFICE 2,585,952

PISTON PACKING RING

Melvin W. Marien, St. Louis, Mo., assignor, by mesne assignments, to Ramsey Corporation, a corporation of Ohio Application February 23, 1950, Serial No. 145,609

9 Claims. (Cl. 309—43)

1

My invention has relation to improvements in piston packing rings for internal combustion engines, and it consists in the novel features of construction more fully set forth in the specification and pointed out in the claims.

The object of the present invention is to provide a piston ring that will eliminate, as nearly as possible, loss of compression by "blow-by," especially through the ring groove around the ring. A further object of the invention is to accomplish this object without high unit ring pressure that would cause frictional drag over the cylinder wall.

Further advantages of the invention will be better apparent from a detailed description of the invention in connection with the accompanying drawing, in which—

Figure 1 is a side elevation of a conventional piston equipped with my improved piston rings; Figure 2 is an enlarged vertical section taken on the line 2—2 of Figure 1; Figure 3 is a side elevation of the invention with part broken away, and Figure 4 is an enlarged horizontal section taken on line 4—4 of Figure 1 with parts broken away.

Referring to the drawings P represents a conventional piston disposed for operation within an engine cylinder C. The piston P is provided with a plurality of grooves $g$, $g$, etc., in each of which is disposed my improved ring R. In the present instance the ring R is composed of five separate elements, I, I, I and 2, 2 arranged in alternation, as shown.

Each of the elements I and 2 consists of spring steel coiled from a flat wire (or ribbon) into a two turn helix, the respective turns $t$, $t$ being connected by an offset $a$ between the ends $e$, $e$ of the turns $t$. The spacing of the ends $e$, $e$ allows for contraction and expansion of the helical ring elements I and 2. It is here to be noted that the helix is formed circumferentially as a perfect circle and as it expands and contracts in operation this circularity is maintained.

The ring elements I, I, I are designed so that their normal outer diameters are greater than the diameter of the cylinder C in which they operate, while the ring elements 2, 2 are designed so that their normal inner diameters are smaller than the diameter of the bottoms $b$ of the ring grooves $g$. Thus when the ring R is disposed in piston ring groove $g$ and the piston P inserted into cylinder C, the ring elements I will expand outwardly to bear against the wall of cylinder C while the ring elements 2 will contract to embrace the bottom $b$ of groove $g$.

2

The radial tension of ring elements I is negligible so that the unit pressure of said elements is just sufficient to keep them in contact with the cylinder wall during the action of the piston. The reason for the low ring pressure is to hold the frictional resistance between ring elements I and cylinder wall to a minimum. This friction is further reduced by coating (preferably by plating) the peripheries of elements I with a layer 3 of chromium, or equivalent metal.

The ring elements 2 have a comparatively high radial tension as they do not contact the cylinder wall but must closely hug the bottom $b$ of groove $g$. However, due to the working clearance between all the elements I and 2 there will be a slight reciprocatory motion of the elements in the groove, and the frictional resistance of elements 2 with the bottom $b$ of the groove is reduced by the anti-friction layers 4 on the inner marginal edges of elements 2. Since there are five elements I and 2 comprising the ring R, and each element consists of two coils there will be ten sealing surfaces to be passed before compression is lost by "blow-by" around the ring.

However, a lesser number of elements I and 2 than here shown are relatively effective in controlling "blow-by," the number of such elements being primarily determined by the width of the piston ring grooves $g$.

From the foregoing it should be apparent that I have provided a piston packing ring effective to prevent blow-by without imposing an excessive frictional drag on the cylinder wall.

Having described my invention, I claim:

1. In combination with an engine cylinder having a piston therein, said piston having a piston ring groove, a piston packing ring in said groove, said ring comprising a plurality of spring elements each of which is coiled in a plurality of turns from a flat ribbon of steel, said elements exerting radial pressure alternately against the wall of the cylinder and the bottom of the ring groove.

2. In combination with an engine cylinder having a piston therein, said piston having a piston ring groove, a piston packing ring in said groove, said ring comprising a plurality of spring elements each of which is coiled in a plurality of turns from a flat ribbon of steel, said elements exerting radial pressure alternately against the wall of the cylinder and the bottom of the ring groove, the radial pressure of the elements against the cylinder wall being substantially less than that of the elements against the bottom of the ring groove.

3. In combination with an engine cylinder having a piston therein, said piston having a piston ring groove, a piston packing ring in said groove, said ring comprising a plurality of spring elements each of which is coiled in a plurality of turns from a flat ribbon of steel, said elements exerting radial pressure alternately against the wall of the cylinder and the bottom of the ring groove, the radial pressure of the elements against the cylinder wall being merely sufficient to maintain circular contact therewith.

4. In combination with an engine cylinder having a piston therein, said piston having a piston ring groove, a piston packing ring in said groove, said ring comprising a plurality of spring elements each of which is coiled in a plurality of turns from a flat ribbon of steel, some of said elements exerting an expanding pressure, and others exerting a contracting pressure.

5. In combination with an engine cylinder having a piston therein, said piston having a piston ring groove, a piston packing ring in said groove said ring comprising a plurality of spring elements each of which is coiled in a plurality of turns from a flat ribbon of steel, said elements being alternately under compression and tension.

6. In combination with an engine cylinder having a piston therein, said piston having a piston ring groove, a piston packing ring in said groove, said ring comprising a plurality of spring elements each of which is coiled in a plurality of turns from a flat ribbon of steel, said elements exerting radial pressure alternately against the wall of the cylinder and the bottom of the ring groove, the former having their cylinder contacting surfaces chromium plated, and the latter having their piston contacting surfaces chromium plated.

7. In combination with an engine cylinder having a piston therein, said piston having a piston ring groove, a piston packing ring in said groove, said ring comprising a plurality of spring elements each of which is coiled in a plurality of turns from a flat ribbon of steel, said elements exerting radial pressure alternately against the wall of the cylinder and the bottom of the ring groove, the former having their cylinder contacting surfaces chromium plated.

8. In combination with an engine cylinder having a piston therein, said piston having a piston ring groove, a piston packing ring in said groove, said ring comprising a plurality of spring elements each of which is formed in a plurality of turns from a flat ribbon of steel, said elements being alternately expanding and contracting.

9. In combination with an engine cylinder having a piston therein, said piston having a piston ring groove, a piston packing ring in said groove, said ring comprising a plurality of annular spring elements, said elements being alternately expanding and contracting.

MELVIN W. MARIEN.

REFERENCES CITED

The following references are of record in the file of this patent:

UNITED STATES PATENTS

| Number | Name | Date |
|---|---|---|
| 1,801,056 | Sacks | Apr. 14, 1931 |
| 2,148,997 | Phillips | Feb. 28, 1937 |
| 2,466,428 | Hufferd et al. | Apr. 5, 1949 |